US011145095B2

(12) United States Patent
Frank et al.

(10) Patent No.: US 11,145,095 B2
(45) Date of Patent: *Oct. 12, 2021

(54) GRAPHICAL USER INTERFACE COMPRISING MULTIPLE, INTERRELATED, AUTOMATICALLY-ADJUSTING COMPONENTS

(71) Applicant: GOOGLE LLC, Mountain View, CA (US)

(72) Inventors: Stefan Frank, Belmont, MA (US); Rodney S. Daughtrey, Cambridge, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,667

(22) Filed: Oct. 25, 2019

(65) Prior Publication Data

US 2020/0058143 A1 Feb. 20, 2020

Related U.S. Application Data

(63) Continuation of application No. 15/004,871, filed on Jan. 22, 2016, now Pat. No. 10,489,944, which is a (Continued)

(51) Int. Cl.
*G06T 11/20* (2006.01)
*G06Q 10/02* (2012.01)
(Continued)

(52) U.S. Cl.
CPC ........ *G06T 11/206* (2013.01); *G06F 3/04842* (2013.01); *G06F 3/04886* (2013.01);
(Continued)

(58) Field of Classification Search
None
See application file for complete search history.

(56) References Cited

U.S. PATENT DOCUMENTS 6,134,534 A 10/2000 Walker et al.
6,307,572 B1 10/2001 DeMarcken et al.
(Continued)

OTHER PUBLICATIONS

Obaid, "U.S. Office Action issued in copending U.S. Appl. No. 13/217,759, filed Aug. 25, 2011", dated Oct. 7, 2014, 10 pages.
(Continued)

*Primary Examiner* — Fateh M Obaid
(74) *Attorney, Agent, or Firm* — Dority & Manning, P.A.

(57) ABSTRACT

Methods, systems, and apparatus, including computer programs encoded on a computer storage medium, for presenting graphical user interfaces comprising multiple components interrelated such that inputs received in one component of a graphical user interface render automatic and corresponding updates for another component of the graphical user interface. In one aspect, a method includes the actions of presenting a graphical user interface; and receiving user input of one or more parameters, the graphical user interface including a calendar portion and an associated graphical portion, the calendar portion comprising a date box for each date in a range of dates, and the graphical portion specifying non-date parameters for trips beginning on each date of the range of dates. A change in the calendar portion of the graphical user interface automatically renders a corresponding change in the graphical portion of the graphical user interface.

20 Claims, 9 Drawing Sheets

Related U.S. Application Data continuation of application No. 13/217,759, filed on Aug. 25, 2011, now abandoned.

(60) Provisional application No. 61/498,216, filed on Jun. 17, 2011.

(51) Int. Cl.
*G06Q 10/10* (2012.01)
*G06F 3/0488* (2013.01)
*G06F 3/0484* (2013.01)

(52) U.S. Cl.
CPC .......... *G06Q 10/02* (2013.01); *G06Q 10/1093* (2013.01); *G06T 2200/24* (2013.01)

(56) References Cited

U.S. PATENT DOCUMENTS

| | | | |
|---|---|---|---|
| 7,263,663 B2 | 8/2007 | Ballard et al. | |
| 7,917,387 B2 | 3/2011 | Spurr et al. | |
| 8,484,057 B2 * | 7/2013 | Crean | G06Q 10/02 705/5 |
| 8,566,143 B2 * | 10/2013 | Etzioni | G06Q 30/0202 705/7.35 |
| 8,799,795 B2 | 8/2014 | Daughtrey | H04L 41/22 715/763 |
| 9,183,560 B2 * | 11/2015 | Abelow | G06Q 10/10 |
| 9,760,959 B2 * | 9/2017 | Nelson | G06Q 50/12 |
| 2003/0171965 A1 | 9/2003 | Ratzlaff et al. | |
| 2004/0122721 A1 | 6/2004 | Lasorsa | |
| 2004/0249801 A1 | 12/2004 | Kapur | |
| 2005/0043974 A1 * | 2/2005 | Vassilev | G06Q 10/02 705/5 |
| 2006/0155598 A1 | 7/2006 | Spurr et al. | |
| 2009/0210262 A1 | 8/2009 | Rines et al. | |
| 2010/0094529 A1 | 4/2010 | Gupta et al. | |
| 2011/0145061 A1 | 6/2011 | Spurr et al. | |
| 2013/0046788 A1 | 2/2013 | Goldstein et al. | |
| 2016/0139736 A1 | 5/2016 | Frank et al. | |

OTHER PUBLICATIONS

Obaid, "U.S. Office Action issued in copending U.S. Appl. No. 13/217,759, filed Aug. 25, 2011", dated Oct. 9, 2013, 10 pages.

Obaid, "U.S. Office Action issued in copending U.S. Appl. No. 13/217,759, filed Aug. 25, 2011", dated Oct. 22, 2015, 13 pages.

Obaid, "U.S. Office Action issued in copending U.S. Appl. No. 13/217,759, filed Aug. 25, 2011", dated Jun. 6, 2014, 9 pages.

Obaid, "U.S. Office Action issued in copending U.S. Appl. No. 15/004,871, filed Jan. 22, 2016", dated Oct. 2, 2018, 11 pages.

Obaid, "U.S. Office Action issued in copending U.S. Appl. No. 15/004,871, filed Jan. 22, 2016", dated Apr. 15, 2019, 17 pages.

Obaid, "U.S. Office Action issued in copending U.S. Appl. No. 15/004,871, filed Jan. 22, 2016", dated Mar. 15, 2018, 12 pages.

Obaid, "U.S. Office Action issued in copending U.S. Appl. No. 15/004,871, filed Jan. 22, 2016", dated Dec. 13, 2017, 15 pages.

Skyscanner, "Skyscanner USA, Aug. 2011, Skyscanner USA- © Skyscanner Ltd", 2002-2011, available online at: https://web.archive.org/web/20110807081040/http://www.skyscanner.com/faq.aspx, 6 pages.

U.S. Appl. No. 13/217,759 to Stefan Frank et al. filed on Aug. 25, 2011.

U.S. Appl. No. 15/004,871 to Stefan Frank et al. filed on Jan. 22, 2016.

* cited by examiner

GRAPHICAL USER INTERFACE COMPRISING MULTIPLE, INTERRELATED, AUTOMATICALLY-ADJUSTING COMPONENTS

CROSS-REFERENCE TO RELATED APPLICATION

This application is a continuation of and claims priority to U.S. patent application Ser. No. 15/004,871 filed Jan. 22, 2016, entitled "Graphical User Interface Comprising Multiple, Interrelated, Automatically-Adjusting Components," which is a continuation of and claims priority to U.S. patent application Ser. No. 13/217,759 filed Aug. 25, 2011, entitled "Travel Calendar" which claims the benefit of U.S. Provisional Patent Application No. 61/498,216, filed Jun. 17, 2011, entitled "Travel Calendar." The entire contents of the above-identified priority applications are hereby fully incorporated herein by reference.

TECHNICAL FIELD

The present disclosure relates generally to graphical user interfaces and, more specifically, to graphical user interfaces comprising multiple components interrelated such that inputs received in one component of the graphical user interface render automatic and corresponding updates for another component of the graphical user interface.

BACKGROUND

Users can use various web sites to plan travel. Conventionally, a user navigates to either a web site corresponding to a particular provider (e.g., a specific airline) or to a web based travel site that provides access to several different providers. Once the user has identified an itinerary for travel, they can typically purchase the itinerary directly through the web site.

SUMMARY

This disclosure relates to methods to cause display devices to render graphical user interfaces comprising multiple components interrelated such that inputs received in one component of a graphical user interface render automatic and corresponding updates for another component of the graphical user interface. In an example embodiment, rendering such graphical user interfaces comprises providing instructions causing a display device to render a graphical user interface, the graphical user interface comprising a calendar portion and a graph portion. The calendar portion comprises a date box for each date in a range of dates, with a portion of the date boxes highlighted and corresponding to a trip identified by one or more initial parameters received at the display device. The calendar portion further comprises a first control user interface element positioned at a beginning edge of the highlighted portion and a second control user interface element positioned at an ending edge of the highlighted portion. The graph portion shows a respective non-date parameter for each of a plurality of trips having a first axis showing dates and a second axis showing trip the respective non-date parameter for each trip, each trip have a beginning date from the range of dates in the calendar portion and a duration equal to the duration of the highlighted portion in the calendar portion. The graph portion is configured to automatically adjust the graph to update the first and second axis in response to a user input changing a position of one or both of the first and second control user interfaces elements in the calendar portion. The calendar portion is also configured to automatically update and adjust the highlighted portion in response to selection of a particular non-date parameter of a trip in the graph portion so that the highlighted portion identifies a trip beginning on a same date and having a same duration as the trip selected in the graph portion.

In certain other example embodiments described herein, systems and computer program products to render graphical user interfaces comprising multiple components interrelated such that inputs received in one component of a graphical user interface render automatic and corresponding updates for another component of the graphical user interface.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

Like reference numbers and designations in the various drawings indicate like elements.

DETAILED DESCRIPTION

Figure 1:
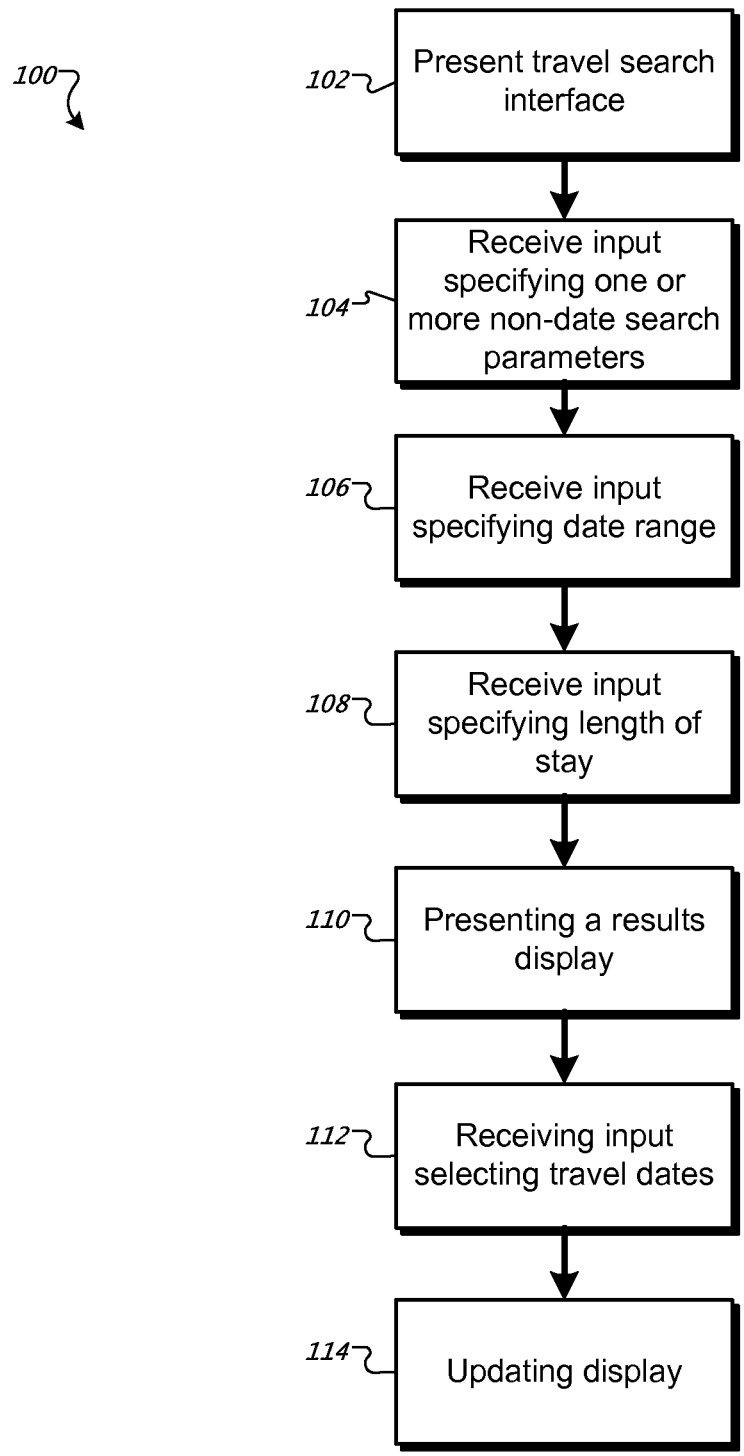
FIG. 1 is a flow diagram of an example process for travel search.

FIG. 1 is a flow diagram of an example process 100 for travel search. For convenience, the process 100 will be described with respect to a system, including one or more computing devices, that performs the process 100.

The system presents a travel search interface (102). The search interface can be presented in response to a user action. For example, the search interface can be presented as part of a particular travel application, e.g., a mobile application, that has been opened by the user or otherwise executed. Alternatively, in some implementations, the search interface is presented as part of a web interface, e.g., through a browser of a user device. The user device can be, e.g., a mobile device, tablet device, laptop, or desktop computer.

The travel search interface provides a number of travel search parameters that the user can specify. In some implementations, the user is able to request the option to specify a greater number or lesser number of travel search parameters than those initially provided. The travel search parameters presented can depend on the type of search. For example, travel search parameters for a hotel search can be different than travel search options for a flight search. For a flight search, the presented travel search parameters can include one or more of an origin location, a destination location, departure date ranges, duration of stay ranges, number of travelers, and other search parameters. For a hotel search, the presented travel search parameters can include one or more of hotel city, arrival date, number of nights, room type, and number of guests. A simpler set of essential travel search parameters, e.g., origin, destination, and dates, can initially be presented. The user can then request that additional travel search parameters be presented.

Figure 2:
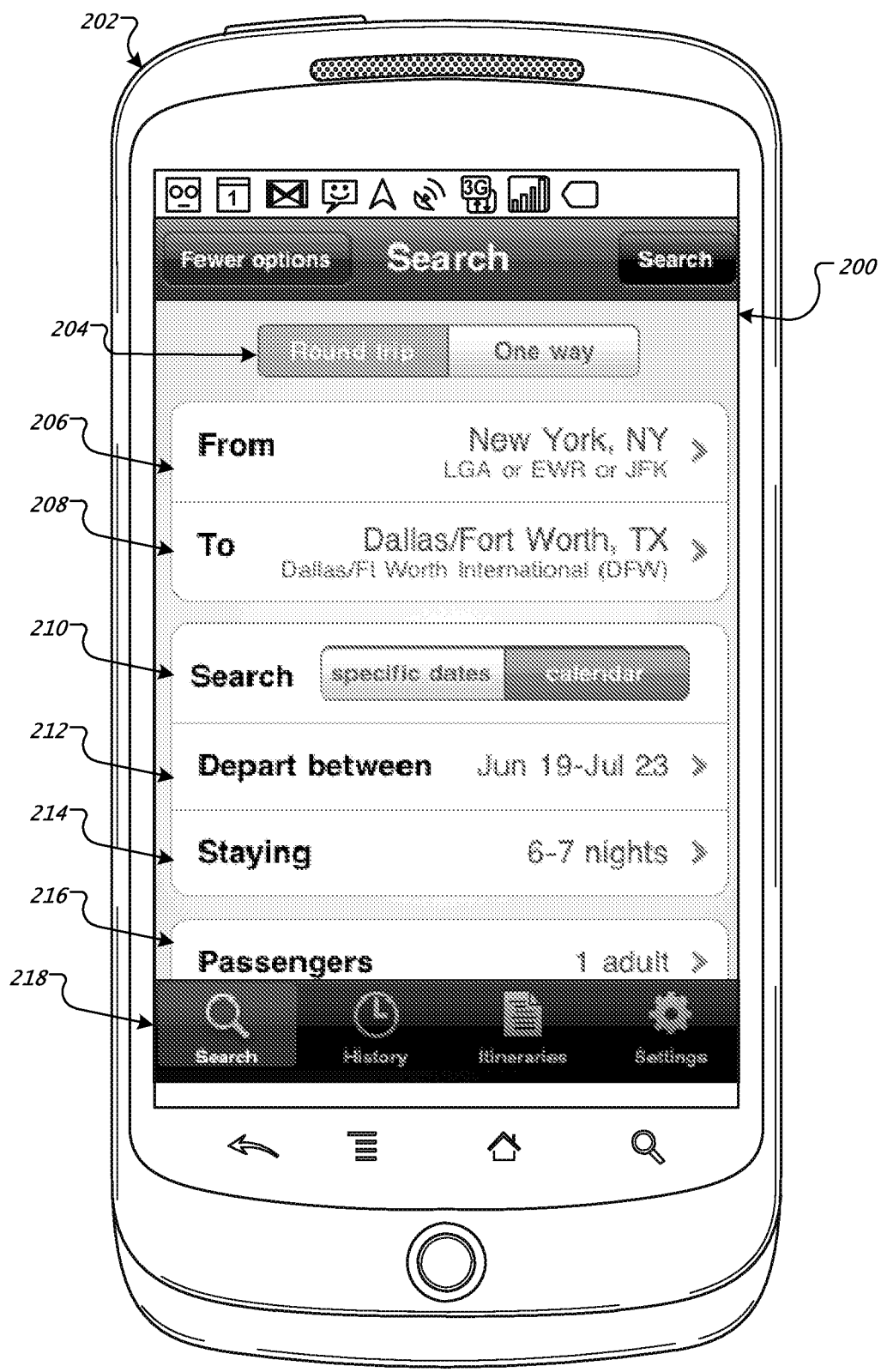
FIG. 2 is an example travel search interface.

FIG. 2 is an example travel search interface 200. The travel search interface 200 is shown as displayed on a mobile device 202. However, the travel search interface 200 can be displayed on other types of user devices including those having touch screen displays and those having non-touch screen displays. In some implementations, the travel search interface 200 is displayed on a touch display such that the user can interact with displayed elements using touch inputs.

The travel search interface 200 allows a user to specify a number of flight travel search parameters. The combination of these parameters can then be used to search for flights that satisfy the flight travel search parameters. For example, the user can select a search button 220 on the travel search interface 200 to initiate a search.

The flight travel search parameters shown in the travel search interface 200 include a flight type 204, an origin 206, and a destination 208. The flight type 204 indicates whether the flight is one way or round trip. The user can select (e.g., by touch or using a cursor of an input device) the flight type. Additionally, a default selection can be made when the travel search interface 200 is presented. As shown in FIG. 2, the "round trip" flight type 204 is displayed as being highlighted, indicating selection.

The origin 206 and destination 208 allow for user input specifying a city or specific airport from which a flight will originate and to which the flight will arrive. For example, the origin 206 can be specified by input to a corresponding text field for inputting a city or airport code. Alternatively, selection of the origin 206 can result in a drop down or other listing of cities and/or airports. In some other examples, a search interface is provided in which the user can input some or all of a city or airport name and search for matching results. Similarly, the destination 208 can be specified in a text field or using drop down listing for inputting a city or airport code. A user can select more than one airport for a given city or metropolitan area. In some implementations, specifying a city results in a presentation of one or more airports for selection. As shown in FIG. 2, the user has indicated a flight that departs New York City from any of the three local airports, LaGuardia (LGA), Newark (EWR), or John F. Kennedy (JFK).

In some implementations, a user specifies preferred airports or cities. For example, a user can establish preferences including a default origin location (e.g., the user's home city or current location) as well as generate a list of frequent destinations from which to select.

The displayed flight travel search parameters also include a search mode 210, departure dates 212, and trip duration 214. The search mode 210 indicates whether the flight search is for specific dates or flexible using a calendar. The user can select (e.g., by touch or using a cursor) the search mode 210. Additionally, a default selection can be made when the travel search interface 200 is presented. As shown in FIG. 2, the "calendar" search mode is shown as highlighted indicating selection. In the "specific dates" search mode the user specifies specific dates for the departure date 212 and trip duration 214.

The departure dates 212 indicates when the flight departs. The departure dates 212 can be a specific date or a range of dates. Selecting a range of dates is described in greater detail below. The trip duration indicates the length of the travel, e.g., the duration between the departing flight and the returning flight. The length of travel can be a specific number of days or a range. Selecting a length of travel is described in greater detail below. In some implementations, the departure dates 212 and trip duration 214 are blank when the travel search interface 200 is first presented.

Other parameters can be included including those partially shown or hidden. For example, a passengers parameter 216 allows a user to specify the number of travelers and is partially shown. In some implementations, a user can scroll the display to reveal additional flight travel search parameters, e.g., using a touch gesture or by interacting with a displayed scroll bars.

Menu items 218 are also presented. The menu items 218 can identify different features of a flight search application. For example, the menu items 218 currently show that a search feature is selected. Consequently, the travel search interface 200 is displayed. Selection of other menu items 218 can result in different displays relating to, for example, travel history, itineraries, and settings depending on the particular travel search application.

As shown in FIG. 1, the system receives input specifying one or more non-date travel search parameters (104). The non-date travel search parameters can include departure and return locations. For example, the user can specify a particular city or one or more airports associated with a city as either the flight origin and the flight destination location. Other non-date travel search parameters can include specifying the number of passengers for the flight, class of service, number of stops, currency, or preferred airlines.

The system receives input specifying a date range parameter (106). The user can specify specific departure and return dates. Alternatively, the user can specify a range of dates within which the travel can be initiated. For example, the user can specify a date range if travel plans are flexible in order to identify a departure date within the range of dates having a lowest price for travel. The date range can be a block of dates defining an earliest and latest departure date to begin the travel.

The system receives input specifying a length of stay parameter (108). The length of stay defines the number of days from the departure to the return. The user can specify a specific number of days, for example, four days. Alternatively, the user can specify a range of dates in order to provide additional flexibility in travel planning. In some implementations, the user can specify a specific number of days of extra duration or reduced duration for the trip. In some implementations, the extra duration or reduced duration are independent.

Figure 3:
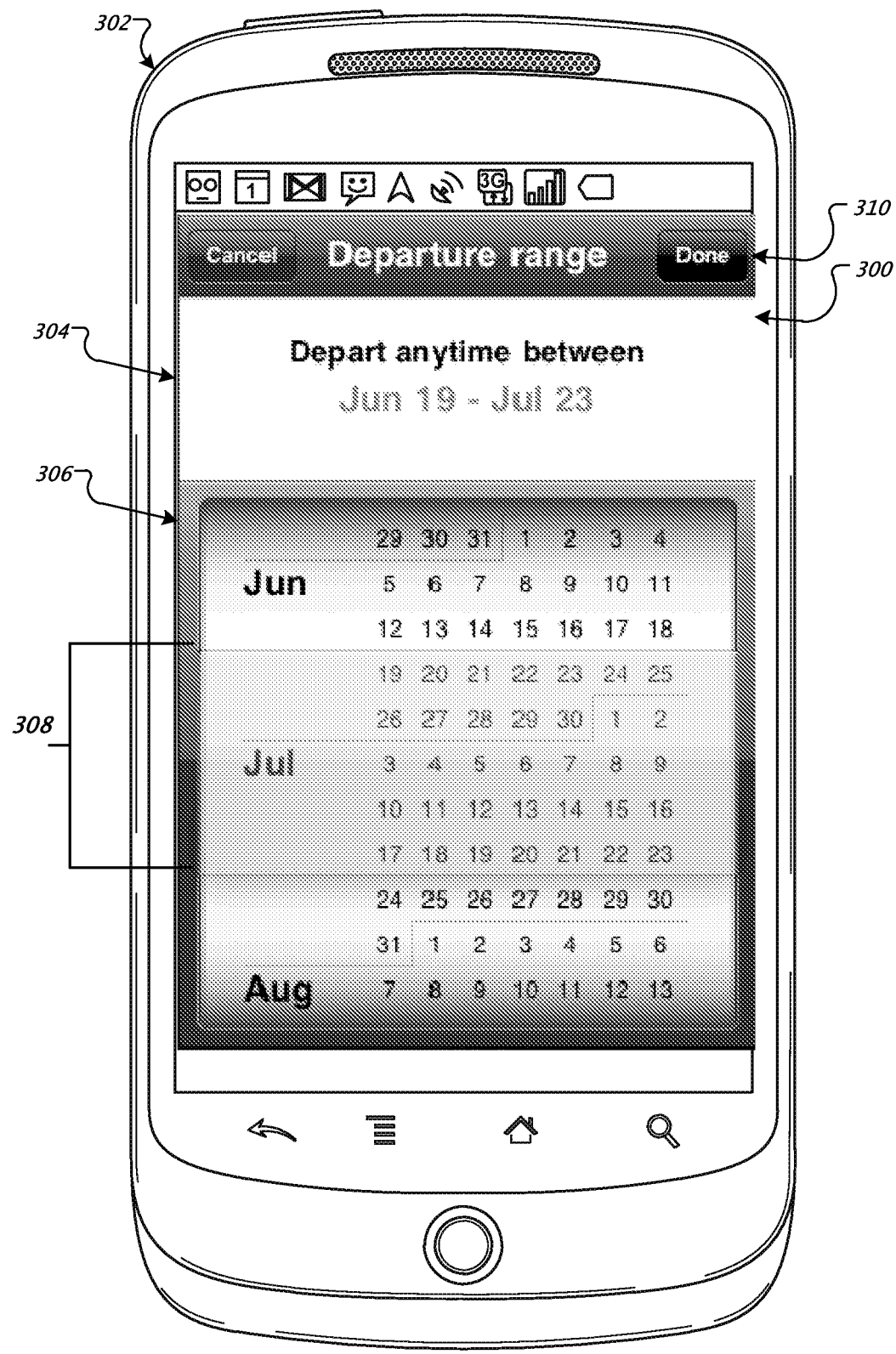
FIG. 3 is an example interface for selecting a date range.

FIG. 3 is an example interface 300 for selecting a date range. The interface 300 is shown as displayed on a mobile device 302. However, the interface 300 can be displayed on other types of user devices including both touch screen and non-touch screen displays. In some implementations, the interface 300 is displayed on a touch display such that the user can interact with displayed elements using touch inputs. The interface 300 can be displayed, for example, in response to a selection of the departure dates 212 in the travel search interface 200 of FIG. 2.

The interface 300 includes a date range display 304, a calendar 306, and a range selection window 308. The date rage display 304 textually displays the currently selected date range. In particular, the date range can define a contiguous range of dates from which the travel can be initiated (e.g., a departing flight anytime between June 19 and July 23).

The calendar 306 can be presented as a visual representation of a wheel or tumbler in which the user can modify the displayed dates by scrolling up or down. For example, the user can scroll using a touch input or cursor input. The calendar 306 is presented as a continuous calendar with the month boundaries demarcated. The range selection window 308 highlights the selected dates from the calendar 306, e.g., based on the user input scrolling the calendar 306. The range selection window 306 highlights a fixed range of dates, e.g., a 35 day block. For example, the range selection window 306 can tint the calendar 306 within the range selection window 306. Other visual indicators can be provided to indicate the dates that are within the range selection window 306, for example, highlighting or coloring the calendar 306 directly for the dates within the range selection window or outlining the dates within the range selection window.

The date range display 304 is updated to indicate the range within the range selection window 306. Once the date range has been specified, the user can select the "done" button 310 to return to a travel search interface (e.g., the travel search interface 200). Alternatively, the user can cancel the date range selection and return to the travel search interface.

Figure 4:
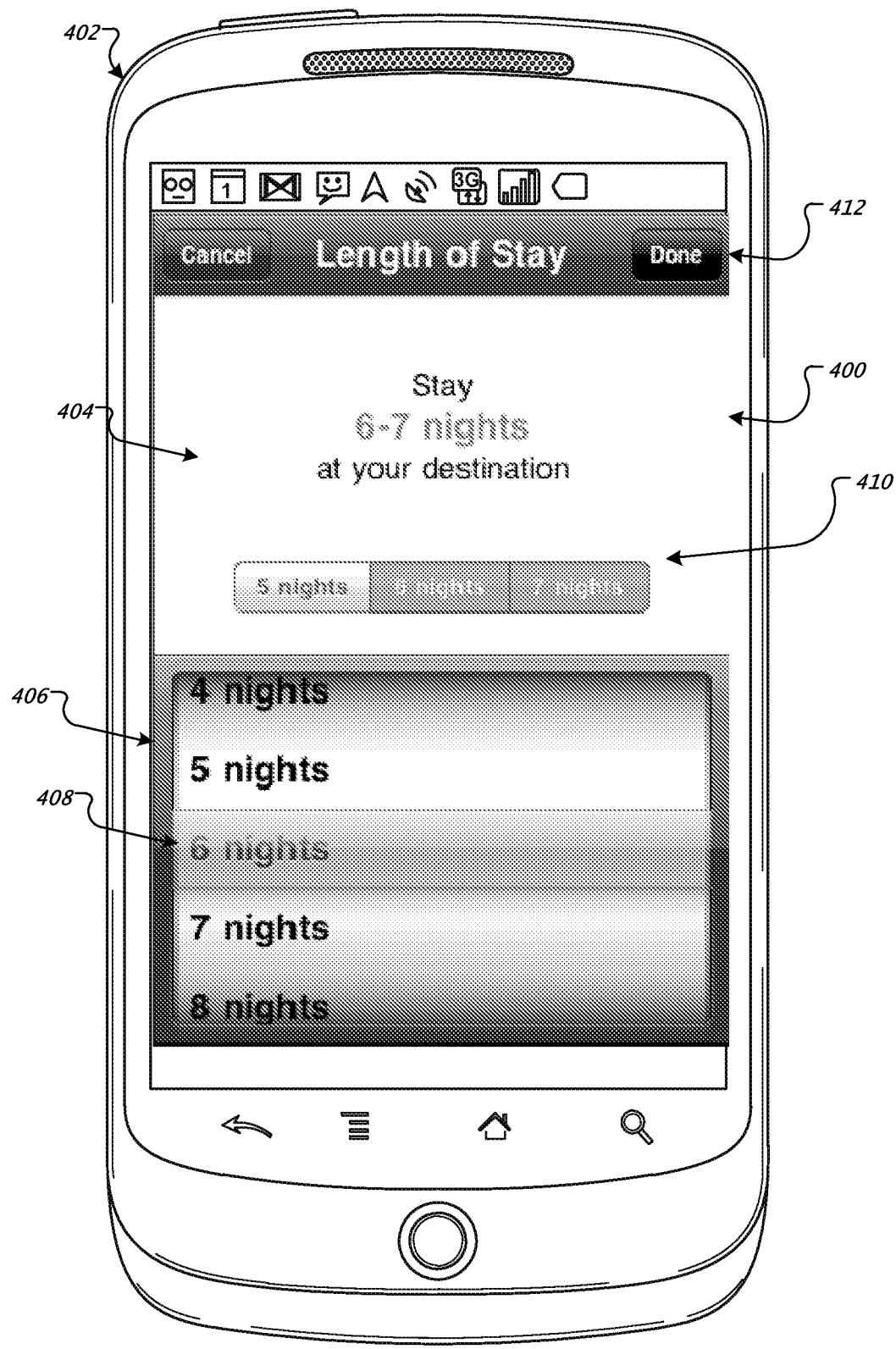
FIG. 4 is an example interface for selecting a travel duration.

FIG. 4 is an example interface 400 for selecting a travel duration. The interface 400 is shown as displayed on a mobile device 402. However, the interface 400 can be displayed on other types of user devices including both touch screen and non-touch screen displays. In some implementations, the interface 400 is displayed on a touch display such that the user can interact with displayed elements using touch inputs. The interface 400 can be displayed, for example, in response to a selection of the trip duration 214 in the travel search interface 200 of FIG. 2.

The interface 400 includes a duration display 404, a duration tumbler 406, a duration selection 408, and a duration adjustment control 410. The duration display 404 textually displays the currently selected duration, e.g., 6-7 nights. The duration display 404 can be updated based on user inputs to other portions of the interface 400.

The duration tumbler 406 can be presented as a visual representation of a wheel or tumbler in which the user can modify the displayed duration amount by scrolling up or down. For example, the duration tumbler 406 can display incrementing numbers of night duration. In some implementations, there is a default minimum and maximum duration (e.g., 1 night min to 30 nights max).

The duration selection 408 indicates the currently selected duration. The duration selection can be responsive to a user input selecting the particular duration from within the duration tumbler 406. Alternatively, the duration selection 408 can be the center displayed duration on the duration tumbler 408 such that the particular selected duration changes as the user scrolls the duration tumbler 406.

For a selected duration indicated by the duration selection 408, the duration adjustment control 410 allows the user to include a day increasing or decreasing the duration in order to select a duration range. For example, if the user selects six nights as the duration, the user can then add a seven night and/or five night option using the duration adjustment control 410 in order to specify a duration range. As shown in the duration adjustment control 410, an additional night is selected so that the displayed duration range is 6-7 days. The selections in the duration adjustment control 410 can be persistent such that if the user subsequently changes the duration by scrolling the duration tumbler 406, the duration adjustment selections are maintained. For example, if the user selected 4 nights and allowed for an additional night, changing the duration to 6 nights maintains the additional night such that the selected duration is 6 to 7 nights.

Once the duration has been specified, the user can select a "done" button 412 to return to a travel search interface (e.g., the travel search interface 200). Alternatively, the user can cancel the date range selection and return to the travel search interface.

As shown in FIG. 1, the system presents a results display (110). For example, after specifying the travel search parameters, both non-date and date based, the user can initiate a travel search, e.g., by submitting an input through a travel search interface. The system can then identify travel results responsive to the input travel search parameters and generate a results interface to display the results. The results interface can provide travel pricing information based on the specified travel search parameters. In particular, the results interface can include multiple prices corresponding to the different dates within the selected range of dates and duration.

The results interface can include both a calendar display and a graph or histogram display that charts prices with respect to date or duration over the selected range. Thus, the user can browse prices within the selected range of dates and duration. The selected range can be a large range covering several weeks.

The system receives an input selecting particular dates within the results display (112). For example, a user can interact with the results interface to select particular departure dates within the date range. For a selected date, one or more prices can be displayed. For example, a round trip price for a flight can be displayed for the selected travel durations (e.g., a price for a six day trip starting on the selected date and a price for a seven day trip starting on the selected date). The user can interact with the results, for example, through a selection to the calendar display in the results or to the graph display. The user can modify the selected dates to view prices for other dates within the displayed date range. The system updates the displayed results interface based on the received input (114).

In particular, the user can select different dates within the displayed calendar display, for example, selecting different departure dates, and in some implementations, different return dates. In some implementations, the user can further change the duration within the calendar display. For example, for a selected departure date, date boxes representing calendar dates for the duration of the trip can be indicated in the calendar display (e.g., with highlighting or other coloring). The user can then adjust the end point to change the duration within the calendar display (e.g., by dragging with a finger in a touch interface or cursor in a non-touch interface).

In the graph display, the user can modify the departure date along a time axis for a fixed duration. For example, the user can drag an indicator along the axis. Using the graph, the user can visually see the price changes for the trip depending on the departure date. The calendar portion can be updated accordingly to indicate the selected travel dates in response to the modifications in the graph display.

Thus, regardless of whether the trip dates are modified in the calendar display or the graph display, the respective other user interaction zone (e.g., calendar display or graph portion) is updated accordingly. The user can interact with a particular portion of the results interface, for example that they are more familiar with, and view the corresponding changes in the other portion of the results interface (e.g., a user can be more familiar with the calendar display but view the changed display in the graph portion in response to the user's interaction).

In some implementations, regardless of where the trip dates are manipulated, the cheapest price for the selected dates is shown on the graph display (e.g., as a dotted line) and in another portion of the results display (e.g., an upper right corner including multiple prices if duration flexibility was indicated).

A user can select a particular travel option. For example, a particular flight departure and return date can be selected. The user can then be presented with one or more additional interfaces for choosing the particular flight times and airlines, and provided with options for purchasing the specific itinerary. For example, an array of airlines and flight times on the respective travel dates can be presented for selection. Once an itinerary including a specific departing flight segment and returning flight segment is determined, the user can be directed to a particular booking channel including, for example, to particular airlines or third party booking sites (e.g., particular web sites for third party travel providers).

Figure 5:
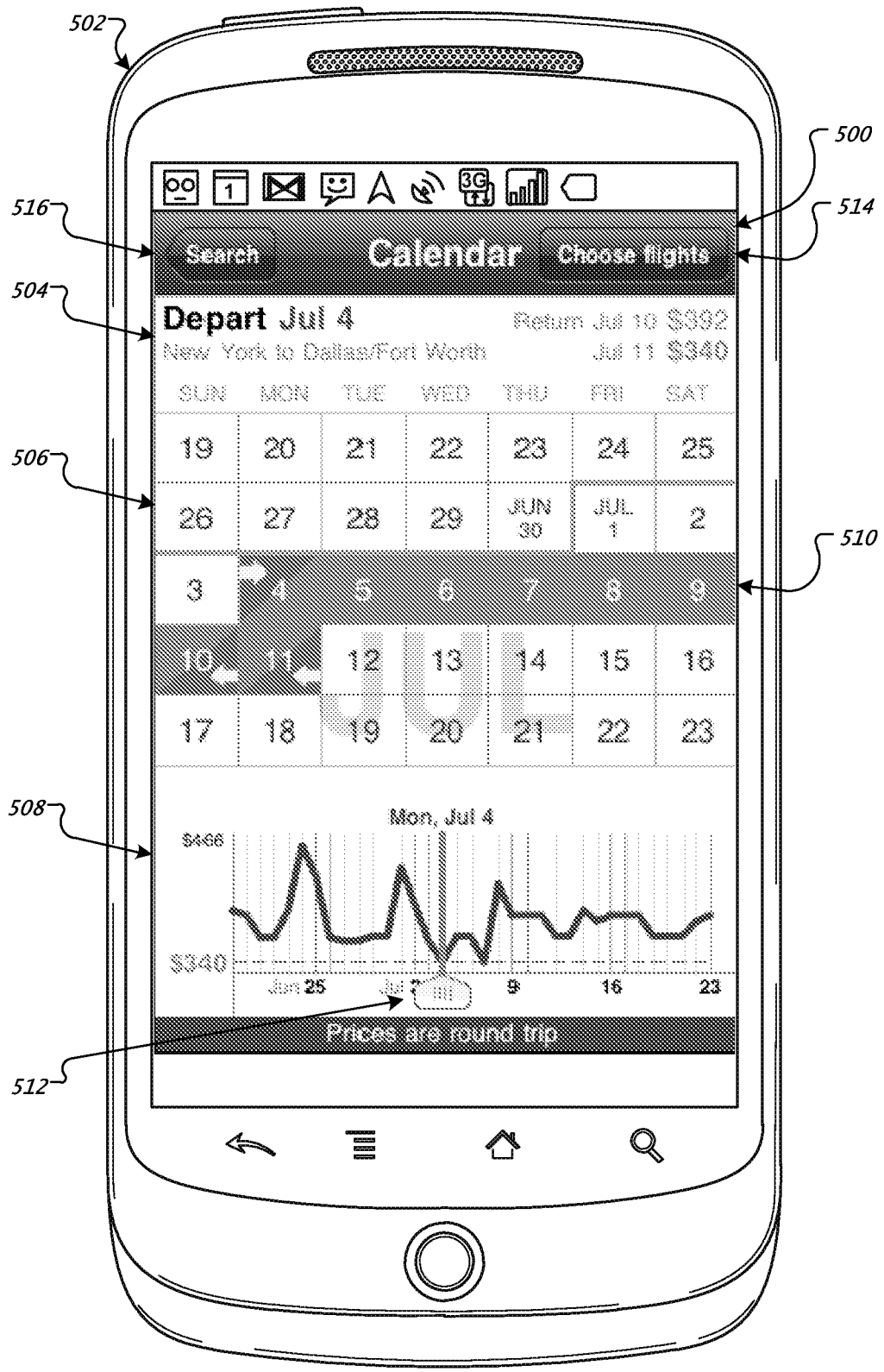
FIG. 5 is an example travel search results interface.

FIG. 5 is an example travel search results interface 500. The travel search results interface 500 is shown as displayed on a mobile device 502. However, the travel search results interface 500 can be displayed on other types of user devices including both touch screen and non-touch screen displays. In some implementations, the travel search results interface 500 is displayed on a touch display such that the user can interact with displayed elements using touch inputs. The travel search results interface 500 can be displayed, for example, in response to a selection of a search button after entering one or more travel search parameters in a travel search interface (e.g., the travel search interface 200 of FIG. 2).

The travel search results interface 500 includes a selected pricing display 504, a calendar portion 506, and a graph display portion 508. The selected pricing display 504 presents pricing for a selected departure date and duration. The selected pricing display 504 includes location information as well as the price for that departure date and one or more returning dates depending on the duration range selected. Thus, for a departure date of July 4 and a duration of 6-7 days, a price is shown for travel returning after 6 days and for travel returning after 7 days. The lower price when multiple duration lengths are displayed can be highlighted or otherwise visually set apart. This pricing display is updated whenever the user modifies the dates or duration within the travel search results interface 500.

The calendar portion 506 includes a date box for each date in a selected date range for travel departure dates (e.g., the date range selected in the interface 300 of FIG. 3). In some implementations, each date box displays pricing information for departures on that date. The selected dates are illustrated within the calendar portion 506. In particular, dates 510 are highlighted to indicate travel durations beginning on July 4 and returning on either the July 10 or July 11. Arrow indicators can illustrate the departure and one or more return dates depending on the selected duration range.

The selected dates can be chosen by user input to the travel search results interface 500. For example, on a touch device, the user input can be a touch input selecting a particular date in the calendar portion 506. In a non-touch device, the user input can be provided using one or more input devices, e.g., a cursor.

The graph display portion 508 charts prices with respect to particular departure dates. In particular, the graph display portion 508 shows departure dates on the x-axis and prices on the y-axis. Thus, for any particular date, the corresponding price is shown. The price for the particular departure date is displayed along the y-axis, shown as $340. The graph display portion 508 presents prices for a fixed duration length, in this case the longest duration. However, in some other implementations, multiple prices for the different duration options are displayed in the graph display portion 508.

The user can move a graph indicator 512 along the x-axis in order to view different prices for different dates. The price in the graph updates as the user moves the graph indicator 512. For example, in a touch device the user can drag the graph indicator 512 with a touch input (e.g., by dragging finger over the graph indicator 512).

Changing departure date by input to the calendar portion 506 can update the graph indicator 512 to point to the selected calendar date in the graph display portion 508. Similarly, changing the date by input to the graph indicator 512 can update the calendar portion 506 to display a corresponding departure date. With either change, the selected pricing display 504 can be updated accordingly. Thus, regardless of whether the trip dates are modified in the calendar portion 506 or the graph display portion 508, the respective other portion (e.g., calendar portion or graph portion) is updated accordingly along with the selected pricing display 504.

When a particular departure date has been selected, the user can continue building an itinerary by selecting a "choose flights" button 514. The user can then be presented with additional options for the selected dates in order to complete an itinerary. The user can further be presented with one or more options for purchasing the completed itinerary. Alternatively, at any point the user can go back, for example, to start a new search or to modify one of the travel search parameters, for example, by selecting a "search" button 516.

While the graph display portion 508 is a plot of price with respect to departure date, other interfaces can present a graph display that is a plot of price with respect to duration. In some implementations, a user can select the particular graph to display and/or toggle between the two graphs. Other types of graphs can be presented, for example, a bar graph, histogram, or other graphical display of price with respect to date.

While the example of a flight search has been used, other types of travel searching can be performed in a similar manner. For example, hotel searching can include receiving user input specifying a range of arrival dates and duration of stay. A similar results interface can be presented for providing pricing information for hotel stays beginning on a selected date within the range of arrival dates. Similar calendar portions and graphical portions can be provided for presenting information to the user on hotel prices with respect to arrival date and duration of stay. Furthermore, a combination of both flight and hotel search can be performed in a similar manner as described with respect to FIGS. 1-5.

In some implementations, information about flights satisfying particular criteria and associated pricing for those flights is presented in travel search results interfaces that allow for additional user interactions with the calendar and graph portions to assist users having travel flexibility to identify optimal travel dates. The travel search results interfaces can include client-side executable instructions, that, when executed by a user device presenting a travel search results interface, cause the travel search results interface to be adjusted in response to user input. For example, the adjustments can cause the travel search results interface to present information about the pricing of trips that have varying departure and return dates and that are of varying durations. These executable instructions can be a client-side script that is executed by a web browser of the user device, such as JavaScript or VBScript code. Alternatively, the executable instructions can be client-executable Java or native client instructions executable on a native client platform on the user device. The client-side executable instructions provide user interface functionality that allows the user to interact with the calendar and graph portions in one or more of the ways that are described below.

Figure 6:
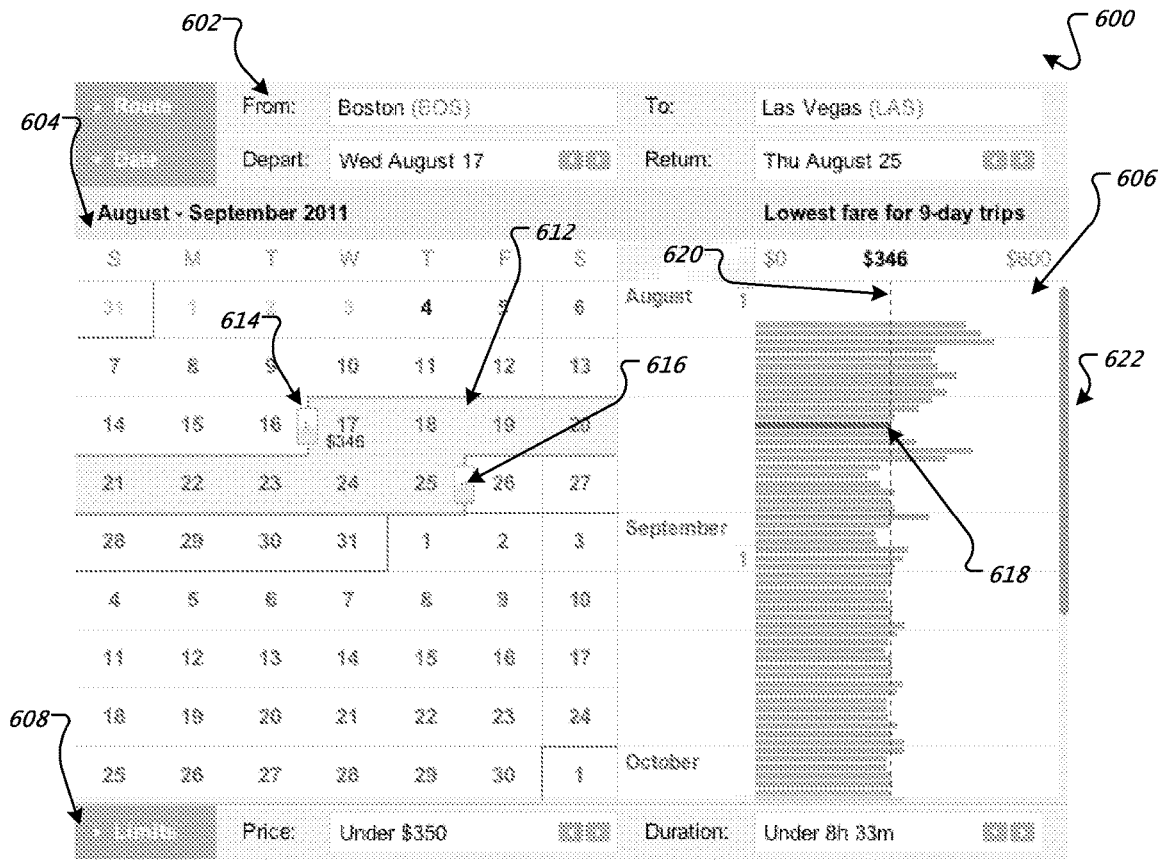
FIG. 6 is another example travel search results interface.

FIG. 6 is another example travel search results interface 600. The travel search results interface 600 includes a selected parameter display 602, a calendar portion 604, a graph portion 606, a limits display 608, and travel search results 610.

The travel search results interface 600 can be displayed, for example, in a web browser of a user device. The user device can present the travel search results interface 600 in response to a user selection of a search button after entering one or more travel search parameters in a travel search interface (e.g., the travel search interface 200 of FIG. 2 or a web based travel search interface). Alternatively, a user can enter the one or more travel search parameters directly through the travel search results interface 600. For example, the travel search results interface 600 can include client executable instructions that, in response to receiving a user input into the selected parameter display 602 identifying one or more travel search parameters, causes the user device to obtain data about trips that is responsive to the travel search parameters and to populate the calendar portion 604, graph display portion 606, limits display 608 and the travel search results 610 with the obtained data as described below.

The limits display 608 allows a user to specify maximum price and duration limits for trips that are displayed in the travel search results 610. In some implementations, default price and duration limits are presented when the travel search results interface 600 is initially presented. In some implementations, the default limits are automatically adjusted in response to user input that changes one or more travel parameters. Further, in some other implementations, the maximum limits in the limits display 608 influence the prices displayed in the calendar portion 604 and graph portion 606, e.g., so that the prices displayed in the calendar and graph portions do not include data from trips having a price or duration that exceeds either the maximum duration limit or the maximum price limit.

The travel search results 610 identify and display information about one or more trips that satisfy each selected travel parameter (e.g., origin, destination, departure date, and return date) and the maximum price and duration limits in the limits display 608. In response to receiving a user input modifying a travel parameter or a price or duration limit, the travel search results can be updated to identify trips satisfying the new criteria.

The calendar portion 604 displays a fixed range of travel dates that includes the selected departure and return dates displayed in the selected parameter display 602. For example, the calendar portion can include a date box for each day in a two-month date range that includes the selected departure and return dates. A trip defined by the selected departure and return dates, i.e., the trip beginning on the departure date and ending on the return date, is denoted within the calendar portion 604 by a highlighted portion 612. In the illustrated example, the highlighted portion 612 extends from the edge of the date box for the departure date, August 17, to the end of the date box for the return date, August 25. User interface elements 614 and 616 are displayed at each end of the highlighted portion 612. A price for a flight itinerary departing on the departure date and returning on the returning date is displayed within the highlighted portion 612. The price can be, for example, the price of the cheapest trip that satisfies each selected parameter. As will be described in more detail below with reference to FIGS. 7, 8, and 9, a user may interact with the highlighted portion 612 and the user interface elements 614 and 616 to change the selected departure and return dates and to view prices associated with flight itineraries having different departure and return dates.

The graph portion 606 is a bar graph that charts prices with respect to particular departure dates. The graph portion 606 shows departure dates on the y-axis and prices on the x-axis. Each bar in the graph portion 606 represents one day. In the illustrated example, the graph portion 606 and the calendar portion 604 are aligned so that the same range of dates is displayed on both the calendar portion 604 and the graph portion 606. Additionally, each week, i.e., row of date boxes, on the graph portion 606 is displayed in horizontal alignment with the corresponding week in the calendar portion 604 so that each week is represented by the stack of seven bars that are horizontally aligned with that week's row of date boxes, with each of the seven bars representing a day of that week. For example, the row of date boxes that represent the week of August 21 in the calendar portion 604 are horizontally aligned with the stack of seven bars in the graph portion 606 that represents the same week.

The length of each bar in the graph portion 606 corresponds to a price of a round trip departing on the day that is represented by the bar and having a duration that is the same as the current trip duration. The current trip duration is the duration defined by the currently selected departure and return dates. In the illustrated example, because the current duration is 9 days (from August 17 to August 28), each bar represents the lowest price of a round trip flight between Boston and Las Vegas departing on the date represented by the bar and having a trip duration of 9 days. The bar 618 that represents the currently selected departure date is visually distinct from, e.g., displayed in a different color from, the remainder of the bars in the graph portion 606. A vertical dashed line 620 indicates the price of the currently selected trip. In some implementations, the length of each bar represents a different price metric associated with round trips departing on the day that is represented by the bar and having a duration that is the same as the current trip duration. For example, the price metric may be an average price, the price of a trip having a desirable combination of price and duration, the price of the cheapest trip satisfying the limits selected in the limits display 608, or the price of the cheapest non-stop flight satisfying the selected limits.

The user can interact with the graph portion 606. For example, the user can interact with the graph portion 606 by clicking a bar representing a particular day with an input device, e.g., a cursor, to change the selected departure and return dates. Changing the selected departure and return dates by input to the graph portion 606 can update the calendar portion 604 and the selected parameter display 602 accordingly. Similarly, changing the selected departure or return dates by input to the calendar portion 604 can update the graph portion 604 and the selected parameter display 602. Additionally, changing the selected dates in the selected parameter display 602 can update both the calendar portion 604 and the graph portion 606. Thus, regardless of whether the trip dates are modified in the selected parameter display 602, the calendar portion 604, or the graph portion 606, the other two portions are updated accordingly.

While the graph display portion 606 is a bar graph with price on the x-axis and departure date on the y-axis, other interfaces can present a graph display that, e.g., has durations rather than prices on the y-axis. In some implementations, a user can select the particular graph to display and/or toggle between the two graphs. Other types of graphs can be presented, for example, a histogram or other graphical display of price with respect to date.

The travel search results interface 600 also includes a scroll bar 622. When a user changes the position of the scroll bar 622, e.g., by selecting and dragging the scroll bar 622 with an input device, the range of dates shown in the calendar portion 604 and the graph portion 606 is adjusted, allowing users to view additional dates that were not included in the initial range of dates. In the illustrated example, if the scroll bar 622 is moved downwards, the range of dates that are displayed will shift so that the two-month period shown in the calendar portion 604 and the graph portion 606 begins at a later date.

Figure 7:
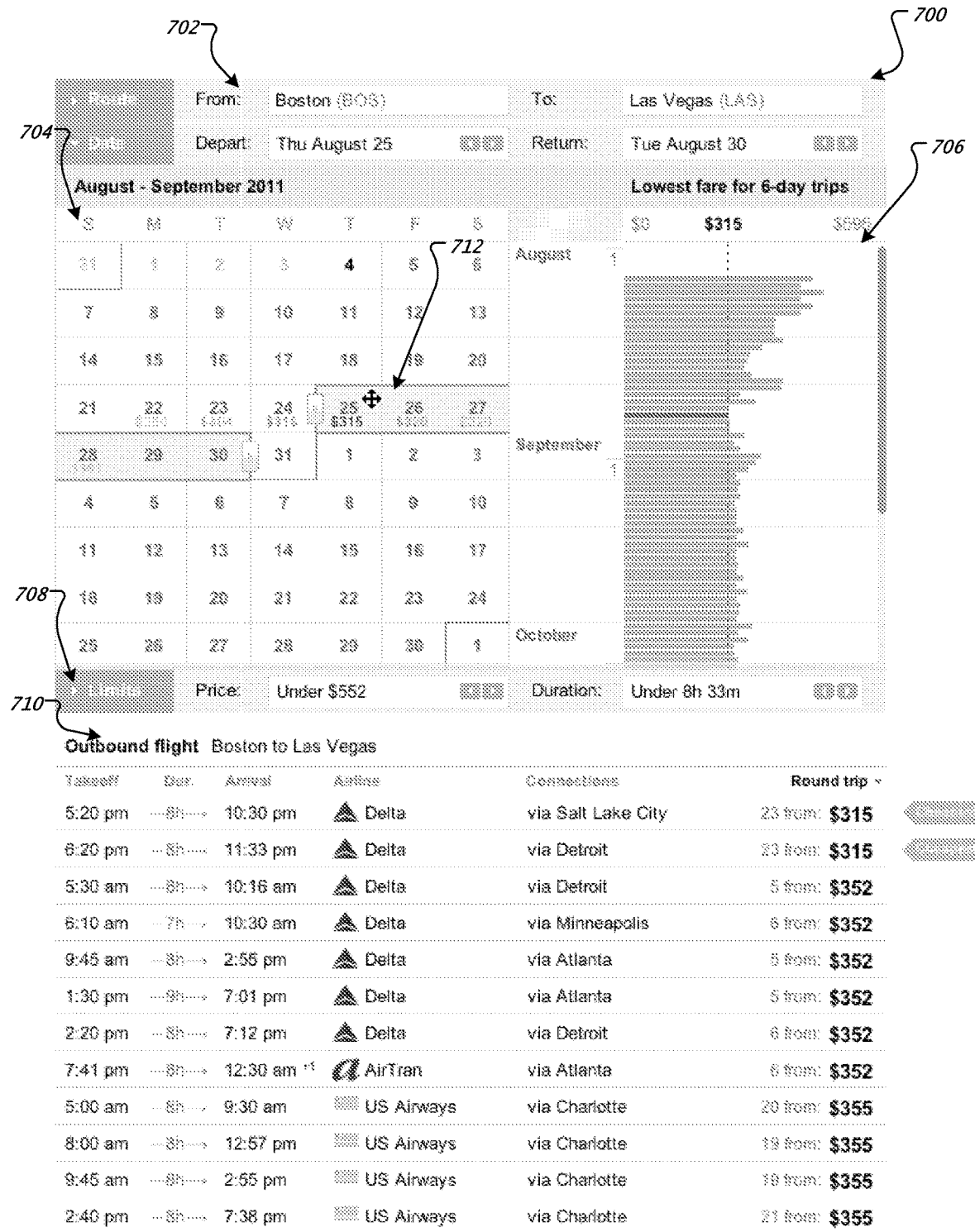
FIG. 7 is an example travel search results interface showing a user interacting with a calendar portion.

FIG. 7 is an example travel search results interface 700 showing a user interacting with a calendar portion 704. The travel search results interface 700 includes a selected parameter display 702, the calendar portion 704, a graph portion 706, a limits display 708, and travel search results 710. In the example travel search results interface 700, a user is interacting with a highlighted portion 712 of the calendar portion 704. In particular, a user has selected the highlighted portion 712, e.g., with a cursor of an input device or by a touch input.

In response to the user's selection of the highlighted portion 712, prices are displayed inside the date boxes in the calendar portion that are near the date box representing the currently selected departure date. The price displayed in a particular date box can be, e.g., the cheapest price for a round trip departing on the date represented by the particular date box and having a duration that is the same as the current trip duration.

In response to receiving an input from the user changing the position of the highlighted portion 712 to cover different date boxes of the calendar portion 704, prices can be displayed inside date boxes that are near the date boxes that represent the departure date, return date, or both that correspond to the current position of the highlighted portion 712 to, e.g., offer the user a preview of the price for travel during that period of time. If the user selects a different date by changing the position of the highlighted portion 712 and indicating that the change in position is final, e.g., by releasing a button on the input device or by terminating a touch input, the information displayed in the selected parameter display 702 and the graph portion 706 is updated accordingly, i.e., to indicate that the currently selected departure and return dates have been changed. Additionally, the travel search results 710 can be updated to present information about trips matching the newly selected departure and return dates.

Figure 8:
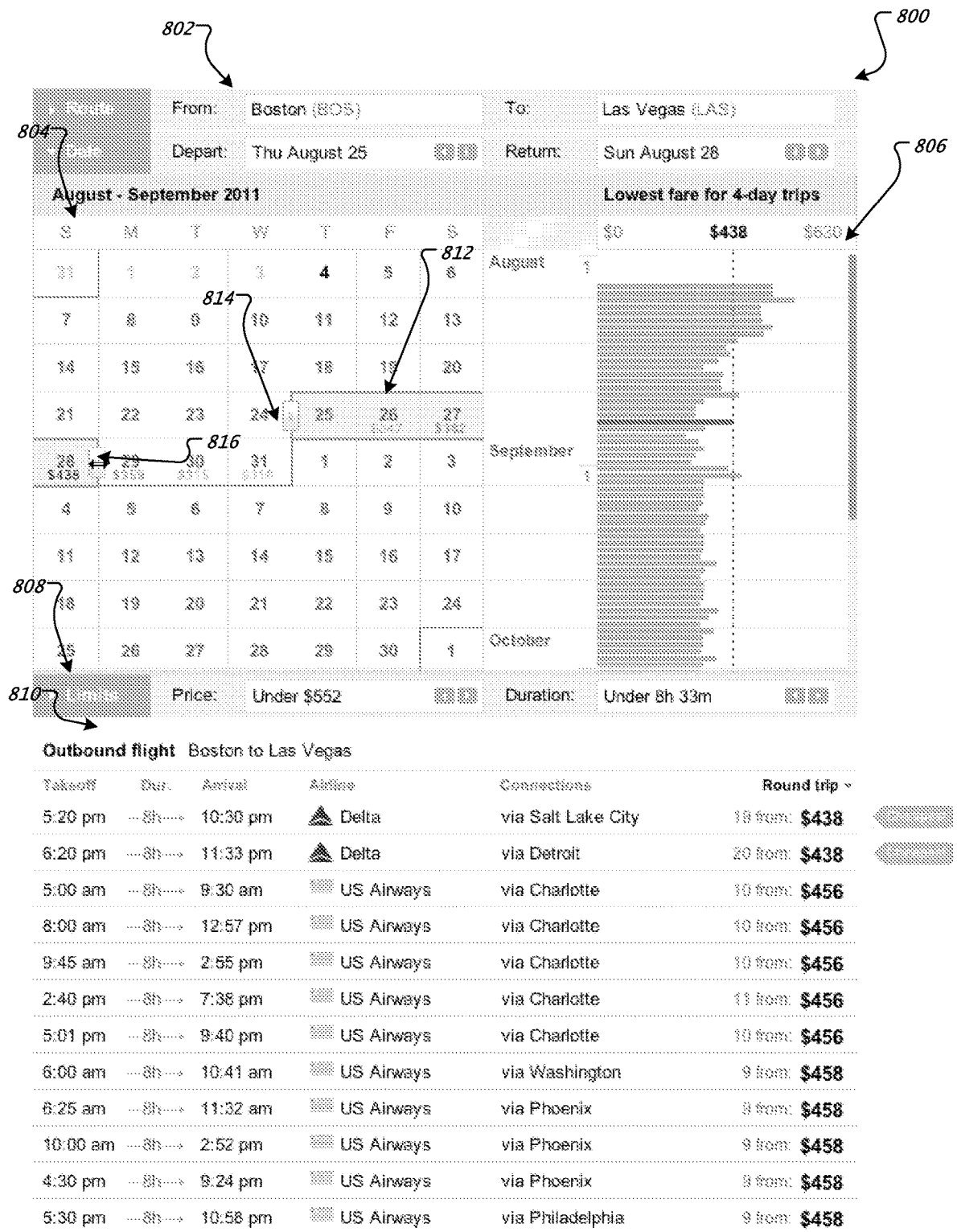
FIG. 8 is an example travel search results interface showing a user changing the return date of a trip.

FIG. 8 is an example travel search results interface 800 showing a user changing the return date of a trip. The travel search results interface 800 includes a selected parameter display 802, a calendar portion 804, a graph portion 806, a limits display 808, and travel search results 810. In the example travel search results interface 800, a user is interacting with a user interface element 816 that is positioned at an end of a highlighted portion 812 of the calendar portion 804. The user interface element 816 is displayed at the end of the highlighted portion 812 that corresponds to the currently selected return date.

In particular, the user may be using an input device to hover over the user interface element 816, for example, by placing a cursor of the input device over the user interface element 816. Alternatively, the user may have selected the user interface element 816 using the cursor or by a touch input. In response to the user input, prices are displayed inside date boxes near the user interface element 816. The price displayed in a particular one of the proximate date boxes can be a price associated with a trip beginning on the selected departure date and having a return date that corresponds to the date represented by the date box. Similarly, in response to a user interacting with a user interface element 814 that is displayed at the end of the highlighted portion 812 that corresponds to the selected departure date, prices can be displayed inside date boxes near the user interface element 814.

In response to an input from the user selecting one of the user interface elements 814 or 816 and dragging the user interface element to a different position, e.g., by moving a cursor while the user interface element is selected or by a touch input, the selected departure or return date can be adjusted to correspond to the new position of the new user interface element. The selected parameter display 802 and the travel search results 810 can be updated accordingly. Additionally, the graph portion can be updated to display information about trips having a duration corresponding to the newly selected duration, i.e., the duration defined by the newly selected departure and return dates.

Figure 9:
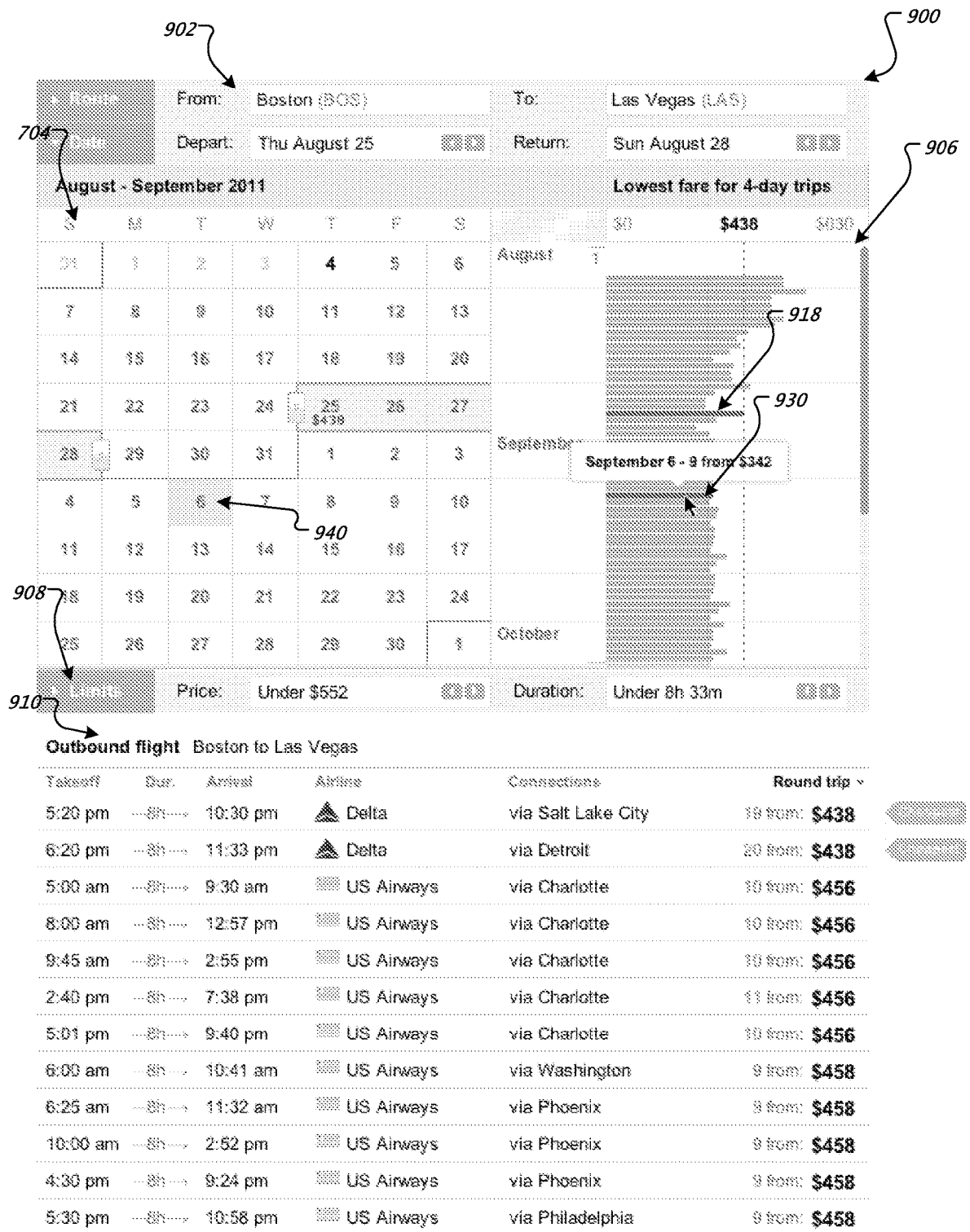
FIG. 9 is an example travel search results interface showing a user interacting with the graph portion.

FIG. 9 is an example travel search results interface 900 showing a user interacting with a graph portion 906. The travel search results interface 900 includes a selected parameter display 902, a calendar portion 904, the graph portion 906, a limits display 908, and travel search results 910. A user has hovered over, i.e., using an input device, a bar 930 in the graph portion 906 that is different from a bar 918 that represents the currently selected departure date. In response, information about trips that have a departure date of the date represented by the bar 930 and a trip duration equal to the currently selected trip duration is displayed in association with the bar 930.

In the illustrated example, the information includes a price associated with the trips and the departure and return dates of the trips. However, other information associated with the trips may be displayed instead or in addition to the displayed information. Additionally, the appearance of the date box 940 is modified to indicate that the date box 940 represents the same date as the bar 930 that is currently being hovered over. Similarly, if a user hovers over or otherwise submits an input identifying a date box corresponding to a particular date, information about trips that have a departure date of the particular date and a trip duration equal to the currently selected trip duration is displayed in association with the date box, i.e., a price may be displayed inside the date box. Additionally, the appearance of the bar that represents the same date as the date box may be altered.

While the example of a flight search has been used, other types of travel searching can be performed in a similar manner. For example, hotel searching can include receiving user input specifying a range of arrival dates and duration of stay. A similar results interface can be presented for providing pricing information for hotel stays beginning on a selected date within the range of arrival dates. Similar calendar portions and graphical portions can be provided for presenting information to the user on hotel prices with respect to arrival date and duration of stay. Furthermore, a combination of both flight and hotel search can be performed in a similar manner as described with respect to FIGS. 6-9.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to cause user devices, in cooperation with travel servers, to render graphical user interfaces, comprising:
   providing instructions causing a user device to render a graphical user interface comprising multiple interrelated portions, the graphical user interface comprising:
   a calendar portion comprising a range of dates; and
   a graph portion comprising a first axis that shows dates and a second axis that shows a respective non-date parameter of a plurality of trips beginning on a respective date of the range of dates and having a common duration;
   receiving, one of i) a user input in the calendar portion changing the range of dates, or ii) a user input in the graph portion selecting a value for the non-date parameter;
   automatically adjusting the graph portion to update the first and second axis in response to the user input in the calendar portion; and
   automatically adjusting the calendar portion in response to the selection so that the calendar portion identifies a trip beginning on a particular date represented by the selection and having a similar or a same duration.

2. The computer-implemented method of claim 1, wherein the graph portion comprises a bar graph, wherein each bar in the bar graph represents a date in the range of dates, and wherein a length of each of the bars corresponds to the non-date parameter for a trip beginning on the date represented by the bar and having a duration equal to the duration of the trip-identified by a highlighted portion.

3. The computer-implemented method of claim 2, wherein, for each week in the range of dates, a row of date boxes that represents the week in the calendar portion is aligned with a group of bars representing the week in the graph portion.

4. The computer-implemented method of claim 3, wherein the user device, in cooperation with a travel server, is further configured to automatically adjust in response to a user input selecting a bar in the bar graph representing a particular date, a position of the highlighted portion to identify a trip having a new trip duration and beginning on the particular date by highlighting a portion of the date boxes that begins with a date box for the particular date and ends with a date box for an end date of the trip beginning on the particular date and having the new trip duration.

5. The computer-implemented method of claim 4, wherein the user device, in cooperation with the travel server, is further configured to display a respective non-date parameter in each of one or more date boxes proximate to a date box representing a departure date of the trip defined by one or more parameters in response to an input selecting the highlighted portion.

6. The computer-implemented method of claim 5, wherein the non-date parameter displayed in each of the date boxes is a non-date parameter for a trip having a departure date equal to the date represented by the date box and having a duration equal to the duration of the trip identified by the highlighted portion.

7. The computer-implemented method of claim 1, wherein the calendar portion comprises a date box for each date in the range of dates, and a first control user interface element positioned at a first date in the range of dates and a second control user interface element positioned at a second date in the range of dates; and
   the user device, in cooperation with a travel server, is further configured to display non-date parameters in one or more date boxes proximate to the control user interface elements in response to an input selecting one or more of the control user interface elements.

8. The computer-implemented method of claim 1, wherein the graphical user interface further comprises a limits display that allows an input to specify one or more trip limits, wherein the one or more trip limits include at least one of a duration limit or a non-date parameter limit.

9. The computer-implemented method of claim 8, wherein the graphical user interface displays one or more travel search results, each travel search result identifying a trip satisfying one or more travel parameters and the one or more trip limits.

10. A non-transitory computer-readable storage device comprising instructions that when executed by a computing device cause the computing device to:

provide instructions causing a user device to render a graphical user interface comprising multiple interrelated portions, the graphical user interface comprising:
  a calendar portion comprising a range of dates; and
  a graph portion comprising a first axis that shows dates and a second axis that shows a respective non-date parameter of a plurality of trips beginning on a respective date of the range of dates and having a common duration;
receive, one of i) a user input in the calendar portion changing the range of dates, or ii) a user input in the graph portion selecting a value for the non-date parameter;
automatically adjust the graph portion to update the first and second axis in response to the user input in the calendar portion; and
automatically adjust the calendar portion in response to the selection so that the calendar portion identifies a trip beginning on a particular date represented by the selection and having a similar or a same duration.

11. The non-transitory computer-readable storage device of claim 10, wherein the graph portion comprises a bar graph, wherein each bar in the bar graph represents a date in the range of dates, and wherein a length of each of the bars corresponds to the non-date parameter for a trip beginning on the date represented by the bar and having a duration equal to the duration of the trip identified by a highlighted portion.

12. The non-transitory computer-readable storage device of claim 11, wherein, for each week in the range of dates, a row of date boxes that represents the week in the calendar portion is aligned with a group of bars representing the week in the graph portion.

13. The non-transitory computer-readable storage device of claim 12, wherein the user device, in cooperation with a travel server, is further configured to automatically adjust in response to a user input selecting a bar in the bar graph representing a particular date, a position of the highlighted portion to identify a trip having a new trip duration and beginning on the particular date by highlighting a portion of the date boxes that begins with a date box for the particular date and ends with a date box for an end date of the trip beginning on the particular date and having the new trip duration.

14. The non-transitory computer-readable storage device of claim 13, wherein the user device, in cooperation with the travel server, is further configured to display a respective non-date parameter in each of one or more date boxes proximate to a date box representing a departure date of the trip defined by one or more parameters in response to an input selecting the highlighted portion.

15. The non-transitory computer-readable storage device of claim 10, wherein the calendar portion comprises a date box for each date in the range of dates, and a first control user interface element positioned at a first date in the range of dates and a second control user interface element positioned at a second date in the range of dates; and
  the user device, in cooperation with a travel server, is further configured to display non-date parameters in one or more date boxes proximate to the control user interface elements in response to an input selecting one or more of the control user interface elements.

16. A system to render graphical user interfaces, the system comprising:
  a storage device; and
  at least one processor communicatively coupled to the storage device, wherein the at least one processor executes instructions from the storage device causing the system to:
    provide instructions causing a user device to render a graphical user interface comprising multiple interrelated portions, the graphical user interface comprising:
      a calendar portion comprising a range of dates; and
      a graph portion comprising a first axis that shows dates and a second axis that shows a respective non-date parameter of a plurality of trips beginning on a respective date of the range of dates and having a common duration;
    receive, one of i) a user input in the calendar portion changing the range of dates, or ii) a user input in the graph portion selecting a value for the non-date parameter;
    automatically adjust the portion graph to update the first and second axis in response to the user input in the calendar portion; and
    automatically adjust the calendar portion in response to the selection so that the calendar portion identifies a trip beginning on a particular date represented by the selection and having a similar or a same duration.

17. The system of claim 16, wherein the graph portion comprises a bar graph, wherein each bar in the bar graph represents a date in the range of dates, and wherein a length of each of the bars corresponds to the non-date parameter for a trip beginning on the date represented by the bar and having a duration equal to the duration of the trip identified by a highlighted portion.

18. The system of claim 17, wherein, for each week in the range of dates, a row of date boxes that represents the week in the calendar portion is aligned with a group of bars representing the week in the graph portion.

19. The system of claim 18, wherein the user device is further configured to automatically adjust in response to a user input selecting a bar in the bar graph representing a particular date, a position of the highlighted portion to identify a trip having a new trip duration and beginning on the particular date by highlighting a portion of the date boxes that begins with a date box for the particular date and ends with a date box for an end date of the trip beginning on the particular date and having the new trip duration.

20. The system of claim 16, wherein the calendar portion comprises a date box for each date in the range of dates, and a first control user interface element positioned at a first date in the range of dates and a second control user interface element positioned at a second date in the range of dates; and
  the user device, in cooperation with a travel server, is further configured to display non-date parameters in one or more date boxes proximate to the control user interface elements in response to an input selecting one or more of the control user interface elements.

* * * * *